United States Patent [19]

Inayama et al.

[11] Patent Number: 4,833,847

[45] Date of Patent: May 30, 1989

[54] FLUSH MOUNTING MOLDING

[75] Inventors: Yukiyoshi Inayama, Tsushima; Akio Sorimachi, Ichinomiya; Tomohiro Sugizaki, Kasugai; Shinichi Goto, Ogaki; Kouichi Satou; Masatoshi Nagata, both of Ichinomiya; Takuji Nagata, Nishikasugai, all of Japan

[73] Assignee: Toyoda Gosei Co., Ltd., Nishikasugai, Japan

[21] Appl. No.: 166,563

[22] Filed: Mar. 10, 1988

[30] Foreign Application Priority Data

Mar. 12, 1987 [JP] Japan .................. 62-36088[U]
Oct. 28, 1987 [JP] Japan ................. 62-164950[U]

[51] Int. Cl.$^4$ .................. E06B 3/62; B60J 1/02
[52] U.S. Cl. ......................... 52/208; 52/397; 52/400; 296/93; 296/201
[58] Field of Search .............. 52/208, 397, 400; 296/201, 93

[56] References Cited

U.S. PATENT DOCUMENTS

| | | | |
|---|---|---|---|
| 2,608,279 | 8/1952 | Pearse | 52/208 |
| 2,736,404 | 2/1956 | Clingman | 52/400 |
| 3,308,588 | 3/1967 | von Wedel | 52/208 |
| 3,815,303 | 6/1974 | Ziegler | 52/400 |
| 3,851,432 | 12/1974 | Griffin | 52/400 |
| 4,401,340 | 8/1983 | Ankrapp et al. | 52/208 |
| 4,405,174 | 9/1983 | Yamane et al. | 296/201 |
| 4,434,593 | 3/1984 | Horike et al. | 52/208 |
| 4,438,609 | 3/1984 | Nielson et al. | 52/208 |
| 4,458,459 | 7/1984 | Irrgang | 52/208 |
| 4,523,783 | 6/1985 | Yamada | 296/93 |

FOREIGN PATENT DOCUMENTS

| | | | |
|---|---|---|---|
| 446717 | 8/1985 | Japan | 296/93 |
| 30415 | 2/1986 | Japan | 296/201 |
| 135822 | 6/1986 | Japan | 296/93 |

Primary Examiner—Michael Safavi
Attorney, Agent, or Firm—Cushman, Darby & Cushman

[57] ABSTRACT

A flush mounting molding of the present invention has a strip-shaped head covering a channel formed between a window frame and a windshield glass of an automobile, and a leg, to be inserted and installed into the channel, having a window frame contacting lip and a windshield glass receiving lip and formed integrally and vertically on the bottom surface of the strip-shaped head. The window frame contacting lip is divided into a plurality of window frame contacting lip members by slits in the longitudinal direction thereof, and the length of the window frame contacting lip members is varied in the direction toward the window frame. Thus, some of the window frame contacting lip members contact with the window frame in approximately perpendicular manner. Accordingly, the flush mounting molding does not come out of the channel. Thus, no defective automobile assembly due to the come-out occurs, and the productivity of the automobile assembly is improved.

15 Claims, 7 Drawing Sheets

α: 90 deg.

α : Acute angle
β : Obtuse angle

Figure 6(d)

α : Obtuse angle
β : Acute angle

FLUSH MOUNTING MOLDING

BACKGROUND OF THE INVENTION

1. Field of the Invention

This invention relates to an automobile flush mounting molding, and particularly relates to an automobile flush mounting molding which absorbs variations of the windshield glass assembly position and prevents the decreasing of the installation force caused by the variations.

2. Discussion of the Background

Figure 7:
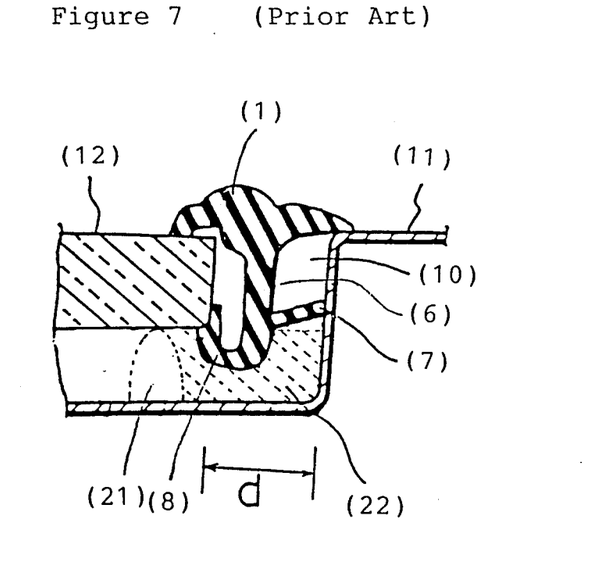
FIG. 7 is a vertical cross-sectional view of a conventional flush mounting molding installed into the channel having a predetermined width and illustrates that the end of the window frame contacting lip of the flush mounting molding contacts with the window frame in approximately perpendicular manner.

A conventional flush mounting molding is shown in FIG. 7. The conventional flush mounting molding has a strip-shaped head (1) and a leg (6) having a window frame contacting lip (7) and a windshield glass receiving lip (8) and formed integrally and vertically on the bottom surface of the strip-shaped head (1). The leg (6) is inserted and installed into a channel (10) formed between a window frame (11) and a windshield glass (12) of an automobile. And the window frame contacting lip (7) has a strip-shape in the conventional flush mounting molding.

The conventional flush mounting molding is installed as follows. A sealant (22) is filled in the channel (10) formed between the window frame (11) and the windshield glass (12). Then, the flush mounting molding is pressed into the channel (10), and is fixed by the sealant (22).

Figure 8:
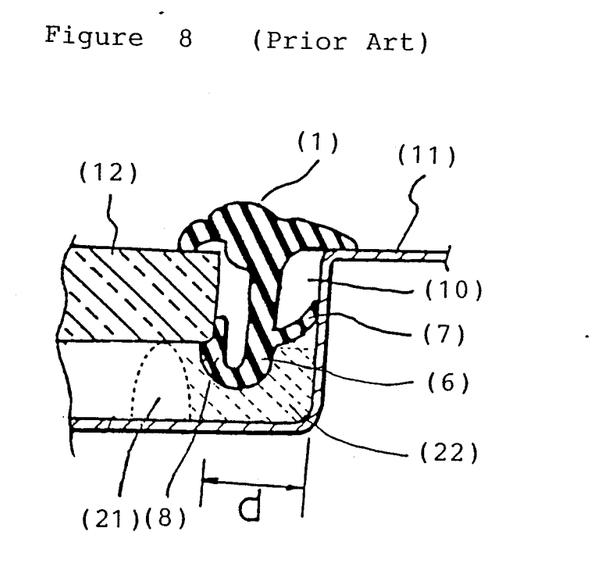
FIG. 8 is a vertical cross-sectional view of the conventional flush mounting molding installed into the channel having a bit smaller width than the predetermined width and illustrates that the window frame contacting lip contacts with the window frame.
Figure 9:
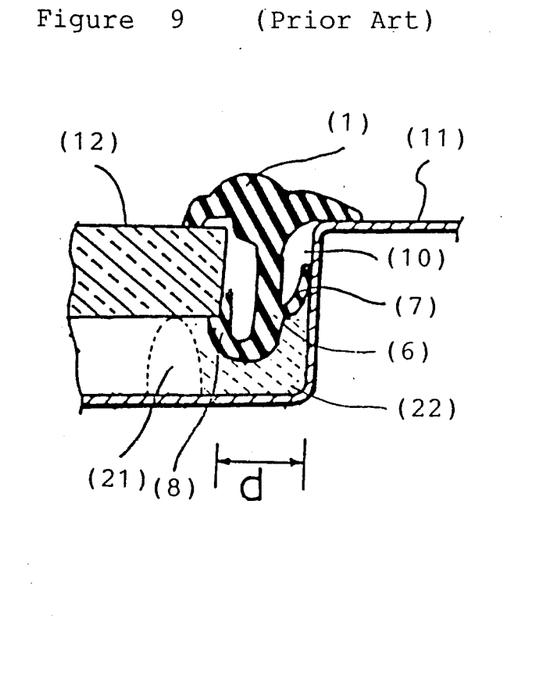
FIG. 9 is a vertical cross-sectional view of the conventional flush mounting molding installed into the channel having a much smaller width than the predetermined width and illustrates that the window frame contacting lip bends back.

However, there usually arise channel (10) width (d) variations from 0 to maximum 4 mm from a predetermined value. When the channel (10) width (d) is a predetermined value, the window frame contacting lip (7) contacts with the window frame (11) in approximately perpendicular manner as shown in FIG. 7. And when the channel (10) width (d) is a bit smaller than the predetermined value, the window frame contacting lip (7) contacts with the window frame (11) as shown in FIG. 8. In these cases, the conventional flush mounting molding provides an installation force enough to prevent its come-out out of the channel (10). But when the channel (10) width (d) is too small, the conventional flush mounting molding provides a less installation force since the strip-shaped window frame contacting lip (7) bends back as shown in FIG. 9 and only the windshield glass receiving lip (8) exerts the installation force. As a result, the conventional flush mounting mold may turn toward the windshield glass or even come out eventually during approximately 24 hours of hardening of the sealant (22).

SUMMARY OF THE INVENTION

The present invention is for solving the above mentioned drawback.

It is an object of the present invention to provide an automobile flush mounting molding which allows to prevent the decreasing of the installation force when the windshield glass assembly position varies.

A flush mounting molding of the present invention has a strip-shaped head covering a channel formed between a window frame and a windshield glass of an automobile, and a leg, to be inserted and installed into the channel, having a window frame contacting lip and a windshield glass receiving lip and formed integrally and vertically on the bottom surface of the strip-shaped head. The windshield glass receiving lip is formed on the end of the leg, and extends upward as well as toward the windshield glass, and contacts with the end of the windshield glass elastically. The window frame contacting lip is formed on one side of the leg, and extends toward the window frame; i.e. extends in the direction opposite to the extending direction of the windshield glass receiving lip. The window frame contacting lip is divided into a plurality of window frame contacting lip members by slits in the longitudinal direction thereof, and the length of the window frame contacting lip members is varied in the direction toward the window frame. Thus, some of the window frame contacting lip members contact with the window frame in approximately perpendicular manner.

The leg of the flush mounting molding of the present invention is first inserted into the channel formed between the window frame and the windshield glass to install the flush mounting molding on an automobile. While the leg is inserted, the window glass receiving lip of the leg extending upward as well as toward the windshield glass is brought into elastic contact with the end of the windshield glass, and the window frame contacting lip of the leg is brought into elastic contact with the window frame.

When the inserting is completed, the strip-shaped head covers the channel, and the window glass receiving lip, formed on the end of the leg and extending upward as well as toward the windshield glass, contacts with the end of the windshield glass, and some of the window frame contacting lip members, dividing the window frame contacting lip in the logitudinal direction thereof and varying in the length toward the window frame, contact with the window frame in approximately perpendicular manner.

Accordingly, if the flush mounting molding should dare to turn toward the windshield glass, no such turning occurs since some of the window frame contacting lip members contact with the window frame in approximately perpendicular manner and a reactive force against the turning is exerted through the window frame contacting lip members. The window frame contacting lip members, having the length longer than those contacting with the window frame in approximately perpendicular manner, extend from the leg to the window frame and contact with the window frame elastically and additionally. And the window frame contacting lip members, having the length shorter than those contacting with the window frame in approximately perpendicular manner, increase the contacting area between the flush mounting molding and the sealant. As a result, the flush mounting molding of the present invention will not come out not only after the sealant has hardened but also before it has hardened.

ADVANTAGE OF THE INVENTION

As described above, the window frame contacting lip members work independently, namely the window frame contacting lip members having the shortest length contact with the window frame in approximately perpendicular manner when the width of the channel is smaller than the predetermined value, and the window frame contacting lip members having the intermediate length contact with the window frame in approximately perpendicular manner when the width of the channel is the predetermined value, and the window frame contacting lip members having the longest length contact with the window frame in approximately perpendicular manner when the width of the channel is greater than the predetermined value. Consequently, the flush mounting molding allows to prevent the decreasing of the installation force and be installed firmly even when the variation of the windshield glass assembly position exists, since the window frame contacting lip members follow the variation in the manner described above.

And when the flush mounting molding is installed into the channel formed between the window frame and the windshield glass of an automobile, the reactive force of the windshield glass receiving lip's elastic force is exerted through the leg to the window frame contacting lip, and is applied to the window frame in perpendicular manner through some of the window frame contacting lip members. Thus, even when the pressing force for inserting the flush mounting molding is removed, the flush mounting molding will not come out of the installation position until the sealant has hardened, since no force turning the flush mounting molding toward the windshield glass is generated, or if it should be generated, the turning force is extremely small. Therefore, no defective automobile assembly due to the come-out occurs, and the productivity of the automobile assembly is improved.

BRIEF DESCRIPTION OF THE DRAWING

FIG. 5 is a perspective illustration of the flush mounting molding.

FIG. 6 (a) is a fragmentary plan view of a window frame contacting lip of the flush mounting molding according to the present invention and illustrates a configuration of the window frame contacting lip of a first modification.

FIG. 6 (b) is a fragmentary plan view of a window frame contacting lip of the flush mounting molding according to the present invention and illustrates a configuration of the window frame contacting lip of a second modification.

FIG. 6 (c) is a fragmentary plan view of a window frame contacting lip of the flush mounting molding according to the present invention and illustrates a configuration of the window frame contacting lip of a third modification.

FIG. 6 (d) is a fragmentary plan view of a window frame contacting lip of the flush mounting molding according to the present invention and illustrates a configuration of the window frame contacting lip of a fourth modification.

FIG. 6 (e) is a fragmentary plan view of a window frame contacting lip of the flush mounting molding according to the present invention and illustrates a configuration of the window frame contacting lip of a fifth modification.

FIG. 6 (f) is a fragmentary plan view of a window frame contacting lip of the flush mounting molding according to the present invention and illustrates a configuration of the window frame contacting lip of a sixth modification.

FIG. 6 (g) is a fragmentary plan view of a window frame contacting lip of the flush mounting molding according to the present invention and illustrates a configuration of the window frame contacting lip of a seventh modification.

FIG. 6 (h) is a fragmentary plan view of a window frame contacting lip of the flush mounting molding according to the present invention and illustrates a configuration of the window frame contacting lip of an eighth modification.

DETAILED DESCRIPTION OF THE INVENTION

The present invention will be hereinafter described with reference to the attached drawings.

Preferred Embodiment

Figure 1:
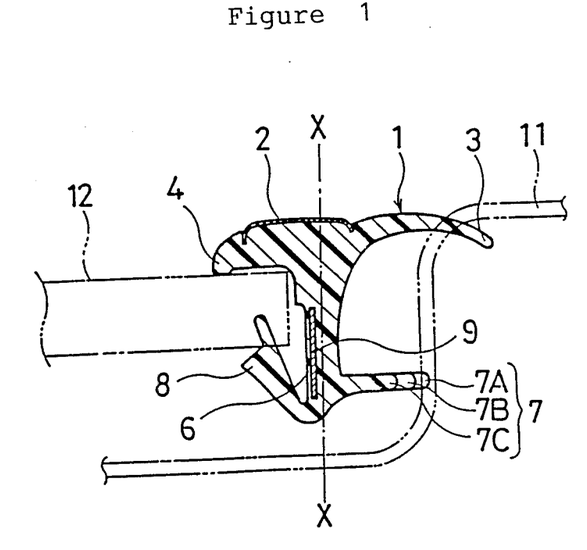
FIG. 1 is a vertical cross-sectional view of a flush mounting molding of the present invention.
Figure 2:
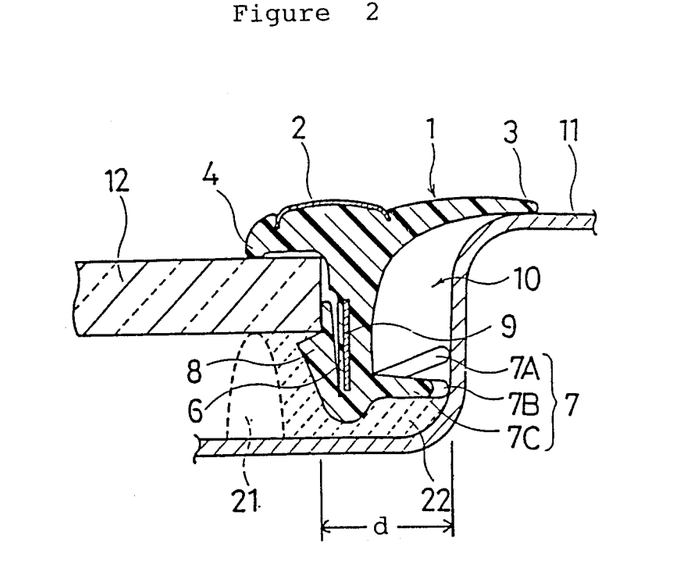
FIG. 2 is a vertical cross-sectional view of the flush mounting molding installed into a channel, formed between a window frame and a windshield glass of an automobile, having a predetermined width.
Figure 3:
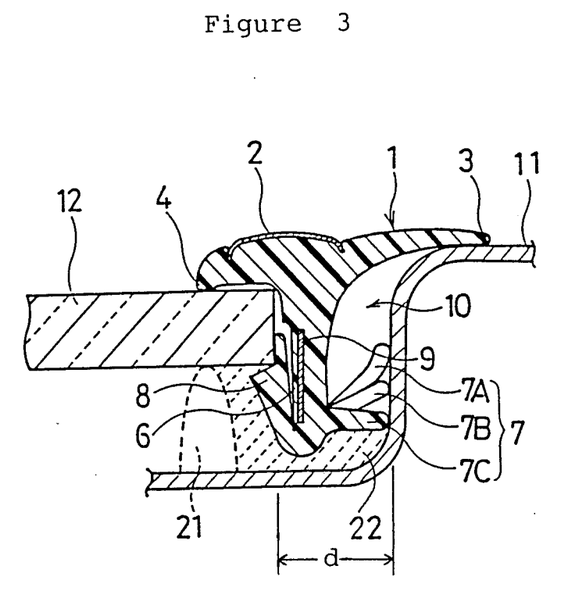
FIG. 3 is a vertical cross-sectional view of the flush mounting molding installed into the channel having a width smaller than the predetermined width.
Figure 4:
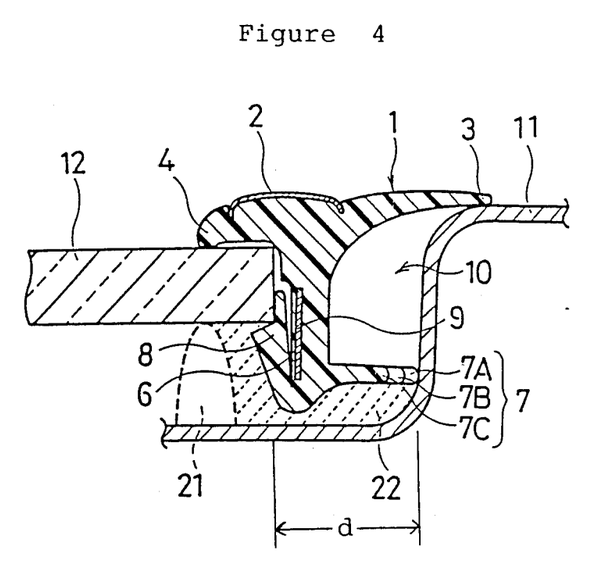
FIG. 4 is a vertical cross-sectional view of the flush mounting molding installed into the channel having a width greater than the predetermined width.
Figures 5, 6A:
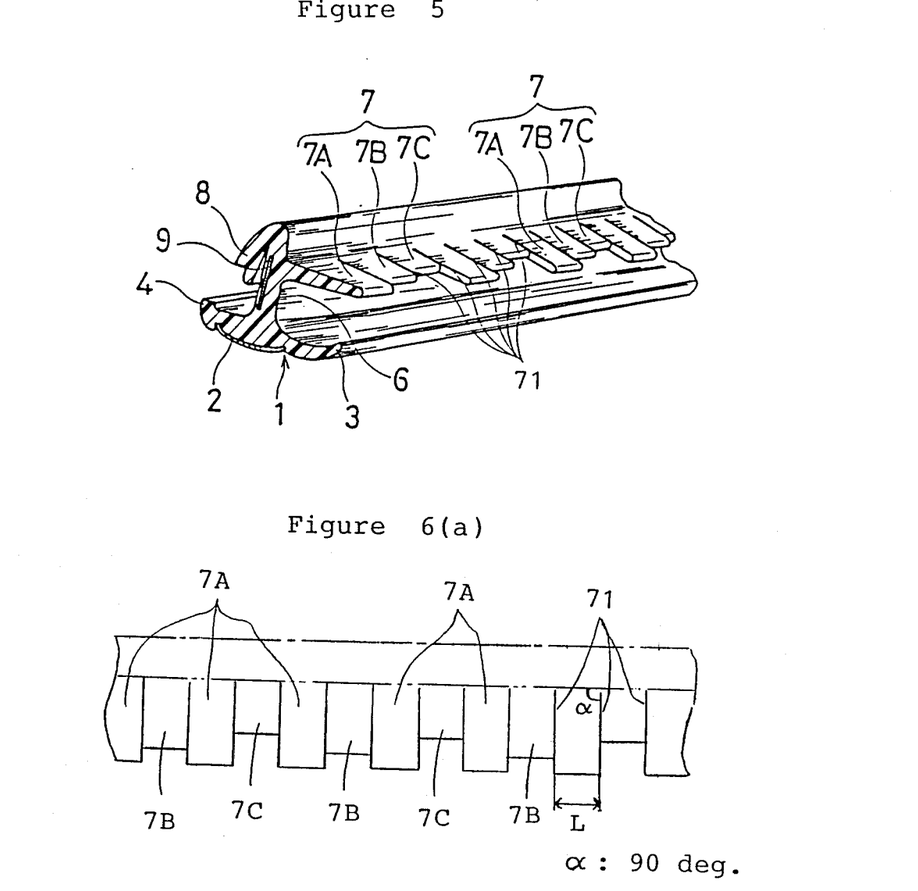

FIG. 1 is a vertical cross-sectional view of a flush mounting molding of the present invention. FIG. 2 is a vertical cross-sectional view of the flush mounting molding installed into a channel, formed between a window frame and a windshield glass of an automobile, having a predetermined width (d). FIG. 3 is a vertical cross-sectional view illustrating the flush mounting molding installed into the channel having the width (d) smaller than the predetermined value. FIG. 4 is a vertical cross-sectional view illustrating the flush mounting molding installed into the channel having the width (d) greater than the predetermined value. FIG. 5 is a perspective illustration of the flush mounting molding.

Turning now to FIG. 1, the strip-shaped head 1 of the flush mounting molding covers a channel 10 formed between a window frame 11 and a windshield glass 12 of an automobile, and is exposed on the surface of the automobile body to present a fine appearance. A glossy film 2 on which a metal such as aluminum or chromium is coated, vapor-deposited or sputtered is embedded in a part of the surface of the head 1. A metal foil itself may be used as the glossy film 2. The head 1 is formed so as to face the glossy film 2 embedded surface to the front.

The head 1 has a body surface pressing lip 3 formed on one of the ends and continuing therefrom. The rear surface of the body surface pressing lip 3 closely contacts with the surface of the automobile body. There is no boundary between the head 1 of the flush mounting molding and the body surface pressing lip 3. These refer to particular components. The body surface pressing lip 3 is made of a soft synthetic resin to seal the channel 10 off, and prevents intrusion of water droplets and dusts into the channel 10.

The head 1 has a windshield glass pressing lip 4 formed on one of the ends and continuing therefrom.

The windshield glass pressing lip 4 closely contacts with the surface of the windshield glass 12. The windshield glass pressing lip 4 is made of a soft synthetic resin to seal the channel 10 off, and prevents intrusion of water droplets and dusts into the channel 10. Similar to the body surface pressing lip 3, there is no boundary between the head 1 and the windshield glass pressing lip 4.

Although the body surface pressing lip 3 and the windshield glass pressing lip 4 are made of a soft synthetic resin in this preferred embodiment, their materials may be changed depending on the application when embodying and practicing the present invention. Namely, either the body surface pressing lip 3 or the windshield glass pressing lip 4 may be made of a soft synthetic resin and the other may be made of a hard synthetic resin, or both of them may be made of a hard synthetic resin.

And the flush mounting molding has a leg 6 formed on the bottom surface of the head 1. The end of the leg 6 is inserted into and fixed in a sealant 22 filled in the channel 10 and blocked with a dam 21 (FIG. 2). The leg 6 is made of a hard synthetic resin. An insert 9 is incorporated in the leg 6. The insert 9 is made of a rigid material, such as a steel strip, an aluminum strip and a synthetic resin strip, having rigidity greater than that of the hard synthetic resin forming the leg 6. The insert 9 made of the rigid material is incorporated in the leg 6 in the longitudinal direction thereof at a position slightly offset from the center axis X—X of the leg 6 to the windshield glass 12 in the vertical cross-sectional view of the flush mounting molding.

The leg 6 has the window frame contacting lip 7 and the windshield glass receiving lip 8. The window frame contacting lip 7 is formed on the side of the leg 6 facing the window frame 11. The window frame contacting lip 7 is made of a soft synthetic resin. And the windshield glass receiving lip 8 is formed on the end of the leg 6 and is extending upward as well as toward the windshield glass 12. The windshield glass receiving lip 8 is made of a soft synthetic resin, and engages with the end of the windshield glass 12 in a close contact manner. Although a pair of the window frame contacting lip 7 contacting with the window frame 11 and the windshield glass receiving lip 8 elastically contacting with the end of the windshield glass 12 is formed in this preferred embodiment, a plurality of the paris may be formed.

The window frame contacting lip 7 is formed on the side opposite to the windshield glass receiving lip 8 formed side as shown in the perspective view of FIG. 5. The window frame contacting lip 7 is divided into a plurality of window frame contacting lip members by slits 71's at intervals of from 5 to 10 mm in the longitudinal direction thereof, and the length of the window frame contacting lip members is varied in the direction toward the window frame 11. Namely, in this flush mounting molding, window frame contacting lip members 7A's having the longest length, window frame contacting lip members 7B's having the intermediate length and window frame contacting lip members 7C's having the shortest length are formed. The length of the window frame contacting lip members 7A's, 7B's, and 7C's is set so that some of the window frame contacting lip members 7A's, 7B's and 7C's contact with the window frame 11 in approximately perpendicular manner. Thus, the width (d) variation of the channel 10 formed between the window frame 11 and windshield glass 12 of an automobile is absorbed when the variation is not more than 4 mm.

Depending on the magnitude of the width (d) of the channel 10, some of the window frame contacting lip members 7A's having the longest length, window frame contacting lip members 7B's having the intermediate length and window frame contacting lip members 7C's having the shortest length contact with the window frame 11 in approximately perpendicular manner. And the windshield glass receiving lip 8 contacts with the windshield glass 12 elastically, and grips the windshield glass 12 with the windshield glass pressing lip 4 of the head 1. And the leg 6 is installed into and fixed in the channel 10 with its end inserted into and fixed in the sealant 22 filled in, the channel 10. Namely, the window frame contacting lip 7 and the windshield glass receiving lip 8 formed on the leg 6 contact respectively with the window frame 11 and the end of the windshield glass 12 elastically. The elastic forces of the window frame contacting lip 7 and the windshield receiving glass lip 8 put the flush mounting molding at a stable position in the channel 10, and hold it in the place. Then, the sealant 22 is hardened to fix the flush mounting molding in the channel 10 stably.

The flush mounting molding thus arranged is installed into and fixed in the channel 10 formed between the window frame 11 and the windshield glass 12 of an automobile as hereinafter described.

Turning now to FIG. 2, the dam 21 is placed on the body flange forming the window frame 11 of an automobile body which is in turn to be the bottom of the channel 10. Then, the sealant 22 is filled in a concave formed by the dam 21 and the body flange forming the window frame 11. And the windshield glass 12 to be assembled is placed on the dam 21 and the sealant 22. Next, the windshield receiving lip 8 and the window frame contacting lip 7 of the flush mounting molding are brought into elastic contact with the end of the windshield glass 12 and the window frame 11 respectively. Finally, the leg 6 is inserted into the channel 10.

The window frame contacting lip 7 and the windshield glass receiving lip 8 elastically contact with the window frame 11 and the end of the windshield glass 12 respectively, and the end of the leg 6 is inserted into the unhardened sealant 22. When the stepped portion of the windshield glass receiving lip 8 and the windshield glass pressing lip 4 of the head 1 grip the windshield glass 12, and when the pressing force for inserting the flush mounting molding is removed, the leg 6 is pressed toward the window frame 11 in the channel 10 since it receives the reactive force of the elastic force of the windshield receiving lip 8. Consequently, some of the window frame contacting lip members 7A's having the longest length, window frame contacting lip members 7B's having the intermediate length and window frame contacting lip members 7C's having the shortest length are brought into contact with the window frame 11 in approximately perpendicular manner.

For instance, when the width (d) of the channel 10 is a predetermined value as illustrated in FIG. 2, the window frame contacting lip members 7B's having the intermediate length are brought into contact with the window frame 11 in approximately perpendicular manner. And when the width (d) of the channel 10 is smaller than the predetermined value as illustrated in FIG. 3, the window frame contacting lip members 7C's having the shortest length are brought into contact with the window frame 11 in approximately perpendicular manner. And when the width (d) of the channel 10 is greater than the predetermined value as illustrated in FIG. 4, the window frame contacting lip members 7A's having the longest length are brought into contact with the window frame 11 in approximately perpendicular manner.

Further, in case the width (d) of the channel 10 is smaller than the predetermined value as illustrated in FIG. 3, the reactive forces of the elastic forces of the window frame contacting lip members 7A's and 7B's, which do not contact with the window frame 11 in approximately perpendicular manner, are exerted to the leg 6 to offset the reactive force of the windshield glass receiving lip 8, and prevent the turning of the flush mounting molding toward windshield glass 12. Furthermore, in case the width (d) of the channel 10 is the predetermined value as illustrated in FIG. 2, the window frame contacting lip members 7C's, which have the shorter length than that of the window frame contacting lip members 7B's contacting with the window frame 11 in approximately perpendicular manner, increase the contacting area between the flush mounting molding and the sealant 22. Thus, the leg 6 is placed at a stable position, and is fixed at the stable position firmly in the channel 10 when the sealant 22 has hardened.

Accordingly, the window frame pressing lip 3 formed on one of the ends of the head 1 and continuing therefrom is brought into contact with the surface of the window frame 11, and the windshield glass pressing lip 4 formed on one of the ends of the head 1 and continuing therefrom is also brought into close contact with the surface of the windshield glass 12. The window frame pressing lip 3 and the windshield glass pressing lip 4 seal the channel 10 off to prevent the intrusion of water droplets and dusts into the channel 10.

In short, the flush mounting molding of the present invention has the strip-shaped head 1 covering the channel 10 formed between the window frame 11 and the windshield glass 12 of an automobile and the leg 6, to be inserted and installed into the channel 10, having the window frame contacting lip 7 and the windshield glass receiving lip 8 and formed integrally and vertically on the bottom surface of the strip-shaped head 1. The windshield glass receiving lip 8 is formed on the end of the leg 6, and extends upward as well as toward the windshield glass 12, and contacts with the windshield glass 12 elastically. The window frame contacting lip 7 is formed on one side of the leg 6, and extends toward the window frame 11; i.e. extends in the direction opposite to the extending direction of the windshield glass receiving lip 8. The window frame contacting lip 7 is divided into a plurality of window frame contacting lip members 7A's, 7B's and 7C's by slits 71's in the longitudinal direction thereof, and the length of said window frame contacting lip members 7A's, 7B's and 7C's is varied in the direction toward the window frame 11; i.e. the window frame contacting lip members 7A's having the longest length, the window frame contacting lip members 7B's having the intermediate length, and the window frame contacting lip member's 7C's having the shortest length.

Thus, the turning of the flush mounting molding caused by the reactive force of the elastic force of the windshield glass receiving lip 8 has been prevented, since some of the window frame contacting lip members 7A's, 7B's and 7C's contact with the window frame 11 in approximately perpendicular manner.

Accordingly, even when the pressing force for inserting the flush mounting molding is removed, the flush mounting molding cannot be turned toward the windshield glass 12 by the reactive force of the elastic force exerted by the windshield glass receiving lip 8 since some of the window frame contacting lip members 7A's, 7B's and 7C's contact with the window frame 11 in approximately perpendicular manner. As a result, the flush mounting molding will be held at the installation position, and will not come out before the sealant 22 has hardened.

Especially, when the width (d) of the channel 10 formed between the window frame 11 and the windshield glass 12 is smaller than the predetermined value as illustrated in FIG. 3, the force causing the flush mounting molding turning toward the windshield glass 12 is not generated, since the reactive force of the elastic force of the windshield glass receiving lip 8 is exerted to the window frame 11 in approximately perpendicular manner through the window frame contacting lip members 7C's contacting with the window frame 11. Even if the aforementioned turning force should be generated, the turning force is offset by the reactive forces of the elastic forces of the window frame contacting lip members 7A's and 7B's which do not contact with the window frame in approximately perpendicular manner. Thus, even when the pressing force inserting the flush mounting molding is removed at the completion of the installation, the flush mounting molding will not come out of the installation position during the hardening of the sealant 22.

By the way, a conventional flush mounting molding does not have the insert 9 made of the rigid material or a conventional flush mounting molding has the insert 9 incorporated on the center axis X—X (FIG. 1) of the leg 6 in the longitudinal direction thereof. Hence, the conventional flush mounting moldings bend at the center axis X—X of the leg 6. On the other hand, this preferred embodiment has the insert 9 incorporated at the position slightly offset from the center axis X—X of the leg 6 to the windshield glass 12 in the longitudinal direction thereof in the vertical cross-sectional view as illustrated in FIG. 1. As a result, the flush mounting molding follows the channel 10 well because the flush mounting molding of the preferred embodiment bends at the insert 9 which is disposed slightly inside the center axis X—X of the leg 6 or slightly to the left side in FIG. 1. Accordingly, it is easy to bend and install the flush mounting molding along the corners of the windshield glass 12. Thus, a stable installation force has been obtained.

The present invention may be practiced or embodied in other forms, though the window frame contacting lip 7 is divided into three kinds of window frame contacting lip members by slits 71's in the longitudinal direction and the length of the window frame contacting lip members is varied in the direction toward the window frame; i.e. 7A's having the longest length, 7B's having the intermediate length and 7C's having the shortest length, in the preferred embodiment described above.

It is apparent that modifications on configurations of the window frame contacting lip 7 are possible depending on the application. And a configuration may be selected from configurations illustrated in FIGS. 6(a), 6(b), 6(c), 6(d), 6(e), 6(f), 6(g) and 6(h) in which fragmentary plan views of the window frame contacting lip 7 are shown.

First Modification

In FIG. 6(a), the window frame contacting lip members 7A's, 7B's and 7C's are arranged in the following manner; i.e. the window frame contacting lip members 7A's are disposed for every other window frame contacting lip members, and the window frame contacting lip members 7B's and 7C's are disposed between the window frame contacting lip members 7A's in turn. Other than this arrangement, this first modification has the same arrangements as the preferred embodiment described above. Namely, the window frame contacting lip 7 is divided into three kinds of window frame contacting lip members 7A's, 7B's and 7C's having different length by slits 71's at intervals of from 5 to 10 mm (L) in the longitudinal direction, and the slits 71's cross the longitudinal axis of the window frame contacting lip at right angle approximately; i.e. alpha=90 deg. And some of the ends of the window frame contacting lip members are not cut at all to form the window frame contacting lip members 7A's having the longest length, and some of them are cut by 2 mm to form the window frame contacting lip members 7B's having the intermediate length, and some of them are cut by 4 mm to form the window frame contacting lip members 7C's having the shortest length.

Second Modification

Figure 6B:
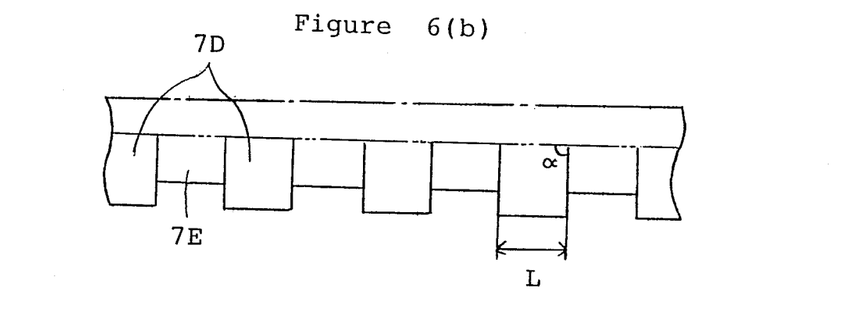

As shown in FIG. 6(b), the window frame contacting lip 7 of this second modification comprises two kinds of window frame contacting lip members; i.e. 7D's having the longer length and 7E's having the shorter length. Some of the ends of the window frame contacting lip members are not cut at all to form the window frame contacting lip members 7D's having the longer length, and some of them are cut by 4 mm to form the window frame contacting lip members 7E's having the shorter length. And the window frame contacting lip members 7D's and 7E's are disposed in turn. The length of the cut is not restricted to 4 mm. Therefore, the ends of the window frame contacting lip members may be cut by various length depending on the application.

Third Modification

Figure 6C:
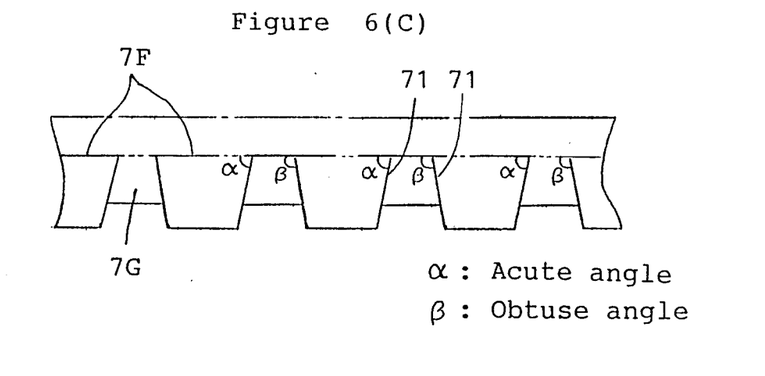

As shown in FIG. 6(c), the window frame contacting lip 7 of this third modification comprises two kinds of window frame contacting lip members; i.e. 7F's having the longer length and 7G's having the shorter length. However, the slits 71's of this third modification do not cross the longitudinal axis of the window frame contacting lip 7 at approximately right angle. The slit 71 crossing the longitudinal axis of the window frame contacting lip 7 at an obtuse angle and the other slit 71 crossing the longitudinal axis of the window frame contacting lip 7 at an acute angle are disposed in turn. Thus, the window frame contacting lip members 7F's having the longer length and an overturned trapezoid shape and the window frame contacting lip members 7G's having the shorter length and a trapezoid shape are disposed in turn in this third modification.

Fourth Modification

Figure 6D:
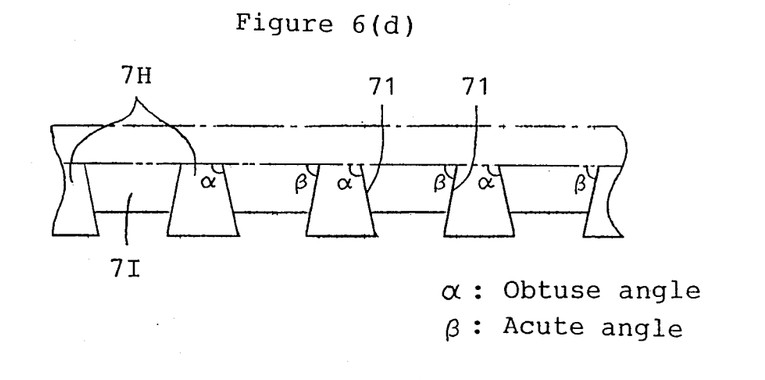

As shown in FIG. 6(d), the window frame contacting lip members 7H's having the longer length and a trapezoid shape and the window frame contacting lip members 7I's having the shorter length and an overturned trapezoid shape are disposed in turn in this fourth modification. Other than this arrangement, this fourth modification has the same arrangements as the third modification.

It is preferred that the slits 71's cross the longitudinal axis of the window frame contacting lip 7 at an angle of from 70 to 110 deg. If they do not cross the longitudinal axis of the window frame contacting lip 7 at an angle within the range of from 70 to 110 deg., the number of the window frame contacting lip members decrease, and some of the window frame contacting lip members show decreased strength.

In the third and fourth modification, at least two of the following slits; i.e. a slit 71 crossing the longitudinal axis of the window frame contacting lip 7 at right angle, a slit 71 crossing the longitudinal axis of the window frame contacting lip 7 at an obtuse angle, and a slit 71 crossing the longitudinal axis of the window frame contacting lip 7 at an acute angle, may be formed in turn or at random. Or three of the slits 71's may be formed regularly or at random.

Fifth Modification

Figure 6E:
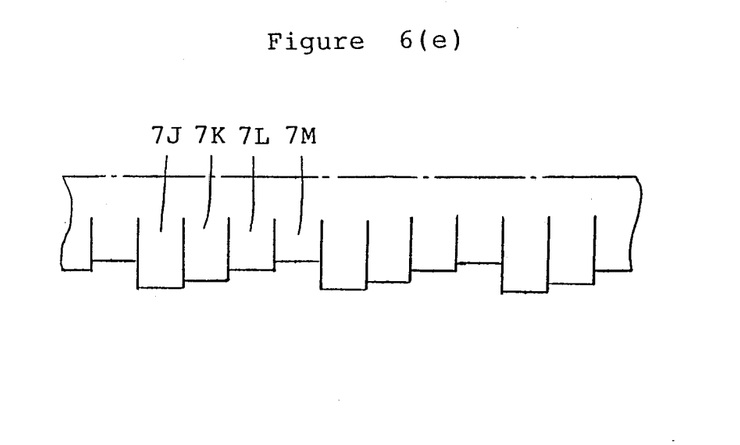

As shown in FIG. 6(e), this fifth modification has the window frame contacting lip 7 comprising four kinds of window frame contacting lip members; i.e. 7J's having the longest length, 7K's having the second longest length, 7L's having the third longest length and 7M's having the shortest length.

Sixth Modification

Figure 6F:
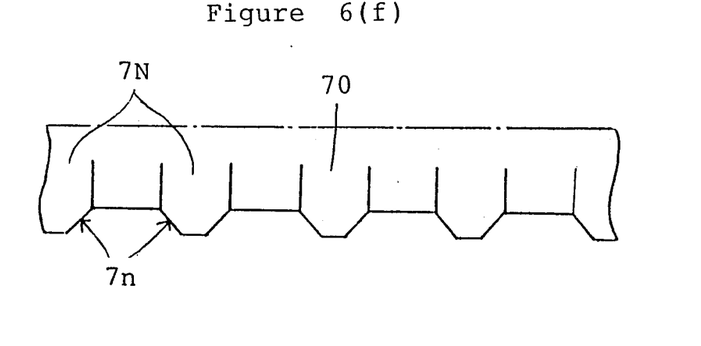

As shown in FIG. 6(f), this sixth modification has the window frame contacting lip 7 comprising two kinds of window frame contacting lip members; i.e. 7N's having a longer length and 7O's having a shorter length. But two corners of the window frame contacting lip members 7N's are cut to form two oblique sides 7n's. The oblique sides 7n's increase the contacting area between the window frame contacting lip 7 and the window frame 11 in this modification.

Seventh Modification

Figure 6G:
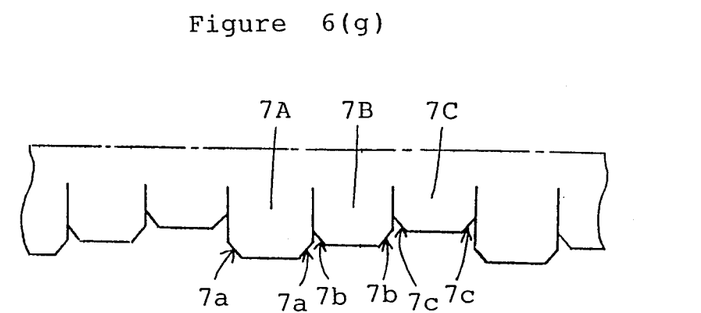

As shown in FIG. 6(g), all two corners of the window frame contacting lip members 7A's, 7B's and 7C's of the above described preferred embodiment are cut to form oblique sides 7a's, 7b's and 7c's in this seventh modification. This seventh modification provides the same effect of increasing the contacting area between the window frame contacting lip 7 and the window frame 11 as the sixth modification illustrated in FIG. 6(f).

Eighth Modification

Figure 6H:
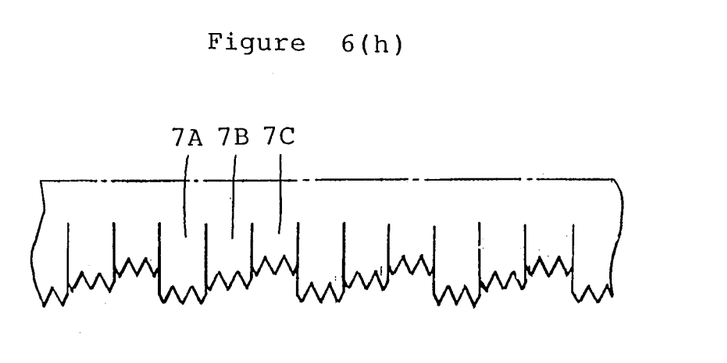

As shown in FIG. 6(h), the ends of the window frame contacting lip members of the above described preferred embodiment are formed into a sawtooth shape in this eighth modification to increase the contact area between the window frame contacting lip 7 and the window frame 11 in this eighth modification.

Again, the present invention may be practiced or embodied by configurations of the window frame contacting lip members other than those described above.

The width (L) of the window frame contacting lip members may not necessarily fall within the range of 5 to 10 mm as in the preferred embodiment described above. The width (L) is may fall within the range of 3 to 20 mm. If the width (L) is 3 mm or less, the window frame contacting lip members do not work properly. If the width (L) is 20 mm or more, the window frame contacting lip members work like a solid strip-shaped window frame contacting lip, and the effect of irregularly arranged ends of window frame contacting lip members deteriorate. It is most preferred that the width (L) fall in the range of from 5 to 10 mm to maximize the effect of irregularly arranged ends of window frame contacting lip members.

Further, the slits 71's may or may not be cut to the base of the window frame contacting lip 7. It is necessary that the slits 71's are formed so as to make the window frame contacting lip members work independently.

What is claimed is:

1. A flush mounting molding comprising:
   a strip-shaped head covering a longitudinal opening defined along a channel formed between a window frame and a windshield glass of an automobile; and
   a leg, to be inserted and installed into said channel, having a window frame contacting lip and a windshield glass receiving lip, said leg being formed integrally with said strip-shaped head and extending downwardly into said channel from a bottom surface of said strip-shaped head; wherein
   said window frame contacting lip has a longitudinal axis substantially parallel to a longitudinal axis of said channel, said window frame contacting lip being divided by transverse slits into a plurality of window frame contacting lip members along the longitudinal axis thereof, each said window frame contacting lip member having a length defined transverse to said longitudinal axis of said window frame contacting lip and toward said window frame, the length of said window frame contacting lip members being varied along said longitudinal axis of said window frame contacting lip.

2. A flush mounting molding according to claim 1, wherein said window frame contacting lip is divided into two kinds of window frame contacting lip members one kind having a relatively longer length, and the other kind having a relatively shorter length.

3. A flush mounting molding according to claim 2, wherein a free end of each said window frame contacting lip member defined by said slits has two corners, the corners of said window frame contacting lip member having a longer length being formed to have oblique sides.

4. A flush mounting molding according to claim 2, wherein each said window frame contacting lip member is defined by a slit crossing the longitudinal axis at an obtuse angle and by a slit crossing the longitudinal axis at an acute angle so that each said kind of window frame contacting lip member has substantially trapezoidal shape, one of said kinds of window frame contacting lip members being defined so that the base of said trapezoidal shape thereof is in facing relation to said window frame.

5. A flush mounting molding according to claim 4, wherein said window frame contacting lip members having a longer length have a trapezoid shape such that the base of said trapezoid is in facing relation to said window frame.

6. A flush mounting molding according to claim 1, wherein said window frame contacting lip is divided into three kinds of window frame contacting lip members, one having a relatively long length, one having a relatively intermediate length, and one having a relatively short length.

7. A flush mounting molding according to claim 6, wherein said window frame contacting lip members are disposed along said longitudinal axis such that every other said window frame contacting lip member is said kind having a longest length, and said window frame contacting lip members having an intermediate length and a shortest length are disposed between said window frame contacting lip members having a longest length, respectively, along said longitudinal axis.

8. A flush mounting molding according to claim 6, wherein free ends of said window frame contacting lip members are formed in a sawtooth shape.

9. A flush mounting molding according to claim 6, wherein a free end of each said window frame contacting lip member defined by said slits has two corners, said corners being formed to have oblique sides.

10. A flush mounting molding according to claim 1, wherein said window frame contacting lip is divided into four kinds of window frame contacting lip members, one having a longest length, one having a second longest length, one having a third longest length, and one having a shortest length.

11. A flush mounting molding according to claim 1, wherein an insert made of a material having a rigidity greater then that of said leg is incorporated into said leg at a position offset from a center axis of said leg in a direction of said windshield glass receiving lip.

12. A flush mounting molding according to claim 1, wherein said window frame contacting lip is divided by said slits at intervals of from 3 to 20 mm into a plurality of said window frame contacting lip members.

13. A flush mounting molding according to claim 12, wherein said intervals fall within the range of from 5 to 10 mm.

14. A flush mounting molding according to claim 1, wherein said slits cross said window frame contacting lip at an angle fall within the range of from 70 to 110 deg.

15. A flush mounting molding according to claim 14, wherein said slits cross said window frame contacting lip at right angle.

* * * * *